United States Patent [19]

Scrivano

[11] Patent Number: 5,516,306
[45] Date of Patent: May 14, 1996

[54] BATTERY ADAPTER

[76] Inventor: Thomas J. Scrivano, 976 Mission Dr., #4, Costa Mesa, Calif. 92626-4228

[21] Appl. No.: 350,549

[22] Filed: Dec. 6, 1994

[51] Int. Cl.[6] .................................................... H01R 3/00
[52] U.S. Cl. ............................................ 439/500; 429/96
[58] Field of Search .................... 439/500; 429/96–100, 429/123

[56] References Cited

U.S. PATENT DOCUMENTS

| | | | |
|---|---|---|---|
| 3,998,516 | 12/1976 | Mabuchi | 439/500 |
| 4,767,358 | 8/1988 | Nullmeyer et al. | 439/500 |
| 4,946,396 | 8/1990 | Saitoh | 439/500 |
| 5,187,026 | 2/1993 | Scrivano | 429/96 |
| 5,316,873 | 5/1994 | Scrivano | 429/96 |

FOREIGN PATENT DOCUMENTS 2230150  10/1990  United Kingdom .................. 439/500

Primary Examiner—David L. Pirlot
Assistant Examiner—Jill Demello
Attorney, Agent, or Firm—Roy A. Ekstrand

[57] ABSTRACT

A battery adapter includes a first cylindrical portion having electrical terminals at each end thereof and defining an interior battery receptacle. The adapter further includes a second cylindrical portion having a pair of electrical terminals at each end and an electrical connection therebetween. The second cylindrical portion defines a notch generally aligned with the battery receptacle of the first cylindrical portion. A pair of spring connectors are captivated within the battery receptacle and connected to each of the terminals of the first cylindrical portion. A conventional disk-shaped planar battery having opposed terminal surfaces is partially inserted into the receptacle contacting the springs captivated therein. The battery extends outwardly from the receptacle into the corresponding notch of the second cylindrical portion.

11 Claims, 1 Drawing Sheet

U.S. Patent  May 14, 1996  5,516,306
FIG. 1 PRIOR ART
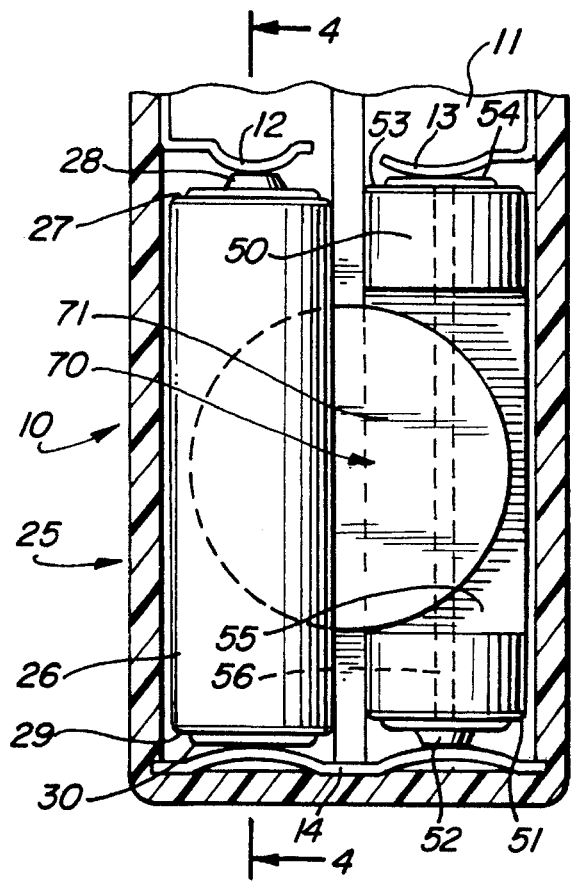
FIG. 2
FIG. 3
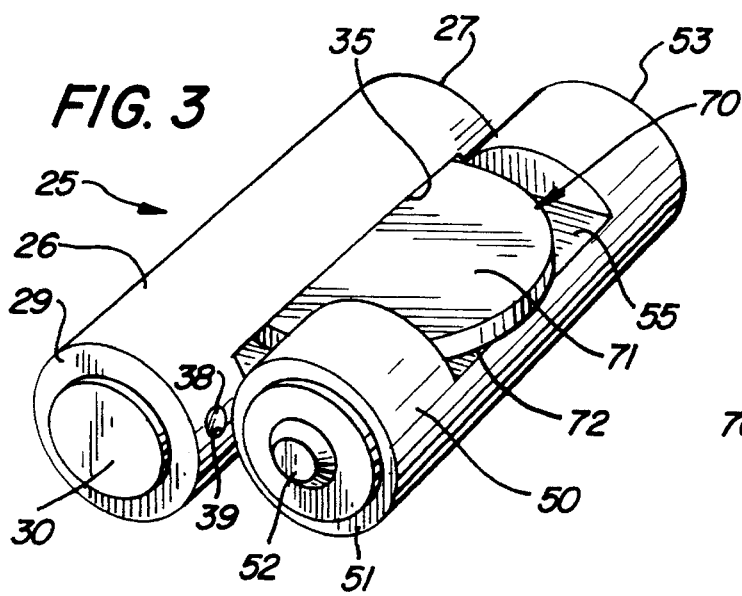
FIG. 4

BATTERY ADAPTER

FIELD OF THE INVENTION

This invention relates generally to batteries and particularly to those used in a low power long life environment.

BACKGROUND OF THE INVENTION

Through the years the majority of batteries used to provide a mobile source of electrical DC power for the virtually endless array of battery powered devices have resulted in the proliferation of batteries in certain standard size units. The most common types of commercially available batteries are those generally designated as A, AA, AAA, C, and D cells. Such standard battery cells are usually alkaline electrochemical sources or the like and produce an electrical voltage of approximately 1.5 volts per cell. In their commercially available form, such standard cells comprise a generally cylindrical elongated housing having an extending positive terminal at one end and a generally flat metallic negative terminal at the other end. To provide the variety of operating voltages for units using such basic standard cells, manufacturers typically provide battery compartments or receptors which support multiple groups of standard round cells in either series or parallel configuration.

FIG. 1 shows a typical prior art battery receptacle for a utilization device generally referenced by numeral 10 which includes a battery cavity 11 having a positive connector 12, a negative connector 13 and a common connector 14 supported therein. A pair of conventional batteries 15 and 18 support positive terminals 17 and 20 respectively and negative terminals 16 and 19 respectively. To provide a 3.0 volt power source, the one and one half volt batteries are arranged in series by oppositely orienting them within cavity 11.

The general operating environment for such standard battery cells may, to some extent, be divided between high power uses and low power uses. High power uses are characterized by the need to run high current apparatus such as electrical motors, heating elements and the like. Conversely, low power uses are typically found in computer type devices such as calculators, remote control units used for televisions and VCR's, smoke detectors and back-up systems or computer memories. While alkaline cells have proved satisfactory for the high power environment, they have been found less than desirable in the low power environment in that their useful life is limited. The typical alkaline cell has a life expectancy in low power or shelf life conditions of approximately one or two years at best.

Other batteries have been developed for use in such lower power long life applications such as the commonly available lithium battery. One of the most common types of such lithium batteries comprises a disk-shaped battery having a 3.0 volt potential which defines a generally planar positive terminal on one side and a downwardly extending generally planar negative terminal on its underside. The overall shape of the most common type of lithium battery is that of a circular disk. However, other shaped batteries have been fabricated to meet specialized needs for practitioners in the art. U.S. Pat. Nos. 5,187,026 and 5,316,873 both issued to Scrivano and entitled BATTERY ADAPTER and also POSITION ADJUSTABLE BATTERY ADAPTER respectively set forth battery adapters which define an exterior configuration corresponding generally to conventional cylindrical alkaline cells which receive and support a disk-shaped long life lithium battery to provide a combined unit which replaces a pair of conventional alkaline batteries in a side by side arrangement with a lithium battery cell. Included within the battery adapters shown are appropriate interconnections to provide external electrical connection between the adapter and the conventional battery receptacle of a utilization device or battery charger.

In addition, a number of devices for supporting and combining such basic alkaline type cells have been provided by practitioners in the art to meet the varying needs of users. For example, U.S. Pat. No. 4,731,306 issued to Dumbser for a BATTERY ARRANGEMENT sets forth a battery arrangement used with distance and speed measuring indicators for cycles. The battery arrangement supports two batteries within a battery chamber having appropriate connections. The connections provide for battery replacement without interrupting the supply of electrical power during the battery replacement process.

U.S. Pat. No. 4,718,742 issued to Utoh, et al. sets forth a BATTERY FITTING DEVICE USABLE FOR ELECTRONIC APPLIANCE in which a battery holder is adapted to accommodate a button shaped battery which is then insertable into a holder accommodating cavity within the appliance. The battery is firmly clamped between contact leaf springs disposed in the battery accommodating cavity.

U.S. Pat. No. 2,522,660 issued to Bledsoe, Jr. sets forth a FOLDABLE HOLDER FOR FLASHLIGHT ELEMENTS in which an elongated generally planar support is formed of a foldable planar material such as rigid cardboard or the like. The folder includes spaced fold lines and interlocking tabs to provide a battery supporting cavity and means for supporting a light bulb. Electrical connections are made to complete a circuit between the battery and light bulb.

U.S. Pat. No. 4,223,076 issued to Terada sets forth a BATTERY CASING which comprises a lid closing a battery receiving chamber. The lid is directly mounted on the battery casing body thereby avoiding the use of the outer panel of the instrument which receives the battery. Electrical connections are provided to couple the appliance to the battery.

U.S. Pat. No. 4,842,966 issued to Omori, et al. sets forth a BATTERY HOLDER MECHANISM for holding a battery in an electronic device. The battery holder has a circular arc portion extending along the circumferential direction of the battery. First and second supporting projections extend from the inner peripheral edges of the circular arc portion and support the battery from both sides. Engagement pawls resiliently lock the battery holder body within the battery receiving hole. The battery is held by projections from both sides to restrict vertical displacement of the battery.

While the foregoing described battery holding apparatus provide some benefit in certain uses, there remains a need in the art for a more convenient way of supplying long lasting battery power to environments of low power use.

SUMMARY OF THE INVENTION

Accordingly, it is a general object of the present invention to provide an improved device for supplying electrical power to low power long life environments. It is a more particular object of the present invention to provide an effective alternative to conventional alkaline power cells in such low power long life environments.

In accordance with the present invention, there is provided a battery adapter for enabling the substitution of a generally planar battery having a pair of battery terminal surfaces in place of a pair of elongated generally cylindrical cells, said battery adapter comprises: a first generally cylindrical housing formed of an insulative material and having first and second ends and a battery receptacle formed therein, the battery receptacle sufficient in size to receive a portion of the generally planar battery; positive and negative terminals supported at the first and second ends respectively; first connection means within the first generally cylindrical housing for coupling each of the battery terminal surfaces to one of the positive and negative terminals; and a second generally cylindrical housing having third and fourth ends each having a terminal thereon and defining a battery receiving opening; and second connection means electrically connecting the terminals on the second generally cylindrical housing.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a prior art battery receptacle in a typical prior art utilization device;

FIG. 2 sets forth a typical utilization device having the present invention battery adapter received therein;

FIG. 3 sets forth a perspective view of the present invention battery adapter together with a conventional lithium battery; and FIG. 4 sets forth a section view of the present invention battery adapter taken along section lines 4—4 in FIG. 2.

DESCRIPTION OF THE PREFERRED EMBODIMENT

FIG. 2 sets forth a battery adapter constructed in accordance with the present invention and generally referenced by numeral 25 supported within a conventional utilization device generally referenced by numeral 10. As set forth above in conjunction with FIG. 1, battery utilization device 10 is typical of a wide variety of utilization devices such as battery-powered apparatus including remote control units for television, vcr's, toys and the like as well as other applications in which it is preferable to employ a longer life lithium-type battery or its equivalent in place of conventional alkaline batteries or the like. In addition, it will be apparent to those skilled in the art that utilization device 10 may also include a battery charger in which the present invention battery adapter is utilized to provide battery charging for a disk-shaped battery. More specifically, utilization device 10 includes a conventional housing defining a battery cavity 11 within which a positive battery connector 12 and a negative battery connector 13 are supported on opposite sides of cavity 11. In further accordance with conventional fabrication techniques described above, a common connector 14 preferably formed of spring steel or the like is supported within the lower end of utilization device 10 and is sufficient in length to extend beneath both positive connector 12 and negative connector 13. With temporary reference to FIG. 1, in accordance with the prior art use of utilization device 10, a pair of generally cylindrical batteries 15 and 18 which may for example comprise AA size or AAA size alkaline batteries are received within utilization device 10 to provide a 3.0 volt power source producing a battery potential between positive terminal 12 and negative terminal 13. In further accordance with its conventional use, common connector 14 of utilization device 10 provides connection between the respective terminals of batteries 15 and 18 for a series configuration.

Returning to FIG. 2, battery adapter 25 is physically configured to be received within utilization device 10 in the same manner as conventional alkaline batteries such as AA or AAA sized batteries are received. It will be apparent, however, that FIGS. 2 through 4 set forth an example for illustration purposes of the present invention, however, battery adapter 25 may readily be utilized to replace pairs of other sized batteries such as standard C or D cells without departing from the spirit and scope of the present invention. Battery adapter 25 includes a cylindrical portion 26 having an end 27 which supports a positive battery terminal 28. Cylindrical portion 26 further includes an end 29 having a negative battery terminal 30 supported thereon. As is better seen in FIGS. 3 and 4 below and as is discussed in greater detail below, cylindrical portion 26 defines a battery receptacle 35 which receives a portion of a conventional disk-shaped battery 70. In the example shown in FIG. 2, disk-shaped battery 70 is a conventional lithium battery having a positive terminal surface 71 on the upper surface thereof and a negative terminal surface 72 on the lower surface thereof (the latter seen in FIG. 4). By means set forth below in greater detail, positive terminal 28 is electrically coupled to positive terminal surface 71 of battery 70 while negative terminal 30 is electrically coupled to negative terminal surface 72 of battery 70. Thus, battery 70 is electrically coupled between positive terminal 28 and negative terminal 30 of cylindrical portion 26.

In further accordance with the present invention, battery adapter 25 further includes a cylindrical portion 50 having an end 51 supporting a terminal 52 and an end 53 supporting a terminal 54. In the example shown in FIG. 2, terminal 52 is configured to replicate a positive battery terminal while terminal 54 is configured to replicate a negative battery terminal. It will be apparent to those skilled in the art, however, that any pair of electrical terminals may be utilized on ends 51 and 53 of cylindrical portion 50 to provide the advantages of the present invention. Cylindrical portion 50 further defines a notch 55 which receives the extending portion of disk-shaped battery 70 when cylindrical portions 26 and 50 are supported within a typically side by side arrangement in utilization device 10. Notch 55 provides a battery clearance opening sufficient to avoid interference between cylindrical portion 50 and the outwardly extending portion of battery 70. It will be apparent to those skilled in the art that virtually any number of differently shaped openings other than notch 55 may be formed in cylindrical portion 50 without departing from the spirit and scope of the present invention. The important aspect of the opening provided by notch 55 is the provision of sufficient clearance for the extending portion of battery 70 to allow the combination of cylindrical portion 26, cylindrical portion 50 and battery 70 to be received within interior cavity 11 of utilization device 10. Thus, for example, notch 55 may, alternatively, be replaced by a differently shaped notch, or a battery receptacle formed within cylindrical portion 50 or other equivalent openings or structure. In further accordance with the present invention, an electrically conductive connector 56 is coupled between terminals 52 and 54 to provide a direct electrical connection therebetween. Thus, cylindrical portion 50 functions to provide a simulated battery to complete the simulated battery pair of adapter 25 and to provide electrical connection between negative connector 13 and common connector 14.

It will be apparent to those skilled in the art that cylindrical portions 26 and 50 may be fabricated of molded half portions which are coupled together and which include appropriate internal structure for receiving the various metal elements operative in the present invention. Alternatively, cylindrical portions 26 and 50 may be fabricated of molded integral units having the necessary connecting apparatus molded therein. In either event, cylindrical portions 26 and 50 are preferably fabricated of an insulated material such as molded plastic or the like.

Thus, with battery adapter 25 and battery 70 assembled within interior cavity 11 in the manner shown, the 3.0 volt battery potential of battery 70 is operatively applied to positive terminal 28 and negative terminal 30 of cylindrical portion 26. Positive terminal 28 is electrically coupled to positive connector 12 of utilization device 10 while negative terminal 30 is coupled to common connector 14 which in turn is coupled to positive terminal 52 of cylindrical portion 50. Connector 56 couples terminal 52 to negative terminal 54. Terminal 54 is connected to connector 13 completing the 3.0 volt battery source applied to positive connector 12 and negative connector 13. Thus, the present invention adapter provides the substitution of a generally planar disk-shaped such as a lithium battery or the like having longer life characteristics within a utilization device configured to receive a pair of conventional cylindrical batteries. It will be apparent to those skilled in the art that while battery adapter 25 is shown for a single pair of conventional batteries, the present invention adapter may be utilized in utilization devices receiving multiple pairs of conventional batteries by simply repeating the structure of adapter 25 in the appropriate number. Thus, two adapters such as battery adapter 25 may be utilized in place of four conventional alkaline batteries or the like.

FIG. 3 sets forth a perspective view of the present invention battery adapter having a conventional lithium battery 70 secured thereto. As described above, battery adapter 25 includes a cylindrical portion 26 having ends 27 and 29. End 29 supports a negative battery terminal 30 while end 27 supports a positive battery terminal 28 (seen in FIG. 2). Battery adapter 25 further includes a cylindrical portion 50 having an end 51 supporting a terminal 52 and an end 53 supporting a terminal 54 (the latter seen in FIG. 20). Cylindrical portion 50 defines a notch 55 while cylindrical portion 26 defines a battery receptacle 35. Battery receptacle 35 forms an elongated opening extending into cylindrical portion 26 which receives a portion of battery 70. Battery 70 is oriented with respect to cylindrical portion 26 to position positive terminal surface 71 upwardly and negative terminal surface 72 downwardly. As is better seen in FIG. 4, a pair of spring connectors are supported within receptacle 35 and coupled to positive terminal 28 and negative terminal 30 in the manner also shown in FIG. 4. Suffice it to note here that battery 70 is electrically coupled to the terminals of cylindrical portion 26. It should be noted that cylindrical portion 26 forms a complete electrical circuit for battery 70 and that cylindrical portion 50 is provided to provide mechanical compatibility with conventional battery pair arrangements as well as to provide electrical connection between the negative terminal of the battery power source and negative terminal 30 of cylindrical portion 26 in the manner shown in FIG. 2. Thus, cylindrical portion 50 takes no part in electrical connection directly to either positive surface 71 or negative surface 72. It should be further noted that battery adapter 25 is able to provide some compensation for the spacing between cylindrical portions 26 and 50 to accommodate different battery spacing within the host utilization device. It should be further noted that in any given application, the orientation of cylindrical portion 50 is reversible without affecting the polarity of voltage applied by the adapter to the utilization device. That it to say, the electrical function of cylindrical portion 50 is to provide an electrical connection between the common connector and one of the polarity connectors such as negative connector 13 of the utilization device in the manner seen in FIG. 2.

Also shown in FIG. 3 is an aperture 39 formed in cylindrical portion 26 through which a light emitting diode 38 is visible. As is better seen in FIG. 4, light emitting diode 38 is coupled between springs 40 and 42. Thus, in the event battery 70 is installed incorrectly, diode 38 conducts providing light through aperture 39 to indicate battery reversal.

FIG. 4 sets forth a section view of battery adapter 25 taken along section lines 4—4 in FIG. 2. As described above, battery adapter 25 includes a cylindrical portion 26 having a battery receptacle 35 formed therein. As is also discussed above, cylindrical portion 26 may be fabricated using alternative methods of fabrication. In the preferred form of fabrication for the present invention, cylindrical portion 26 is formed of a pair of generally mirror image nested half portions 36 and 37. Thus, half portions 36 and 37 are fabricated of separate molded components which are joined or nested to provide cylindrical portion 26. A channel 32 extends outwardly from receptacle 35 at end 27 of cylindrical portion 26 while a channel 31 extends outwardly from receptacle 35 at end 29. A positive terminal 28 and a negative terminal 30 are secured to ends 27 and 29 respectively of cylindrical portion 26 using conventional fabrication techniques.

A curved spring contact 40 is captivated within receptacle 35 and includes a connecting tab 41 extending outwardly through channel 32 which is electrically connected or coupled to positive terminal 28. Similarly, a connector spring 42 is captivated on the opposite side of receptacle 35 and includes a connecting tab 43 extending outwardly through channel 31 which is electrically connected or coupled to negative terminal 30. A conventional lithium battery or its equivalent defines a positive surface 71 and a negative surface 72 and is received within receptacle 35 between spring contacts 40 and 42. It should be recalled from FIG. 2 that battery 70 extends partially into receptacle 35. To maintain proper polarity of the terminal voltages applied to utilization device 10, battery 70 is inserted into battery receptacle 35 such that positive terminal surface 71 contacts spring 40 while negative terminal surface 72 contacts spring 42. It has been found that the spring force provided by springs 40 and 42 is generally sufficient in the use of battery adapter 25 to secure battery 70 and provide reliable electrical coupling thereto.

Light emitting diode 38 is coupled between springs 40 and 42 to provide visible indication of incorrect installation of battery 70. Thus, the cathode of diode 38 is coupled to spring 40 while the anode is coupled to spring 42. With battery 70 installed as shown, its positive terminal contacts spring 40 turning diode 38 off. If the battery is reversed, diode 38 conducts going off light and warning of the battery reversal.

What has been shown is an improved battery adapter which facilitates the replacement of a pair of conventional batteries with a single long life battery such as a lithium battery without mechanical alteration or other changes to the host utilization device. The improved battery adapter shown maintains complete electrical connection to the substituted battery within one cylindrical portion while utilizing the remaining cylindrical portion to provide mechanical compatibility within the host electrical device and to complete the electrical connection from the host utilization device to the substituted battery. The device shown is easily manufactured of conventional molded plastic components together with conventional metal electrical connectors and terminals without undue expense. The device is easily utilized to provide replacement of a variety of differently shaped batteries by simply correspondingly shaping and sizing the respective portions of the adapter.

It has been advantageous to utilize separate cylindrical portions such as cylindrical portion 26 and cylindrical portion 50 in the present invention battery adapter to facilitate the variation of spacing therebetween within the host utilization device. It will be apparent to those skilled in the art however that in the event such spacing adjustment is not desired or necessary, cylindrical portions 26 and 50 may be fabricated of a single molded housing in which cylindrical portions 26 and 50 are commonly joined as a single molded unit. Thus, it will be equally apparent to those skilled in the art that the illustration of the present invention set forth in FIGS. 2 through 4 applies equally well to a single molded element having a first and second cylindrical housing corresponding generally to cylindrical portions 26 and 50 without departing from the spirit and scope of the present invention.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A battery adapter for enabling the substitution of a generally planar battery having a pair of battery terminal surfaces in place of a pair of elongated generally cylindrical cells, said battery adapter comprising:

a first generally cylindrical housing formed of an insulative material and having first and second ends and a battery receptacle formed therein, said battery receptacle sufficient in size to receive a portion of said generally planar battery;

positive and negative terminals supported at said first and second ends respectively;

first connection means within said first generally cylindrical housing for coupling each of said battery terminal surfaces to one of said positive and negative terminals; and a second generally cylindrical housing having third and fourth ends each having a terminal thereon and defining a battery receiving opening; and second connection means electrically connecting said terminals on said second generally cylindrical housing.

2. A battery adapter as set forth in claim 1 further including a light emitting diode coupled to said first connection means.

3. A battery adapter as set forth in claim 1 wherein said second generally cylindrical housing is formed of an insulating material.

4. A battery adapter as set forth in claim 3 wherein said second connection means includes an electrical conductor having opposed ends each connected to one of said terminals of said second generally cylindrical housings.

5. A battery adapter as set forth in claim 4 wherein said battery receiving opening defines a notch.

6. A battery adapter as set forth in claim 5 wherein said first connection means includes:

a first curved spring captivated within said battery receptacle against one of said battery terminal surfaces of said planar battery and having a first tab connected to said positive terminal; and a second curved spring captivated within said battery receptacle against the remaining battery terminal surface of said planar battery and having a second tab connected to said negative terminal.

7. A battery adapter as set forth in claim 6 further including a light emitting diode having a cathode coupled to said first curved spring and an anode coupled to said second curved spring.

8. A battery adapter for enabling the substitution of a generally planar battery having a pair of battery terminal surfaces in place of a pair of elongated generally cylindrical cells, said battery adapter comprising:

a first generally cylindrical housing having first and second opposed ends each having a terminal thereon and a battery receptacle for receiving at least a portion of said generally planar battery;

connection means within said first generally cylindrical housing for connecting each of said terminal surfaces to one of said terminals; and a second generally cylindrical housing having an opening for receiving a portion of said planar battery extending from said battery receptacle, third and fourth opposed ends, and conductive means extending between said third and fourth ends, said first and second generally cylindrical housings positionable in a side-by-side relationship whereby said planar battery is partially received within said battery receptacle and extends partially into said opening.

9. A battery adapter as set forth in claim 8 wherein said second generally cylindrical housing is formed of an insulating material.

10. A battery adapter as set forth in claim 9 wherein said battery receiving opening defines a notch.

11. A battery adapter as set forth in claim 10 wherein said connection means includes:

a first curved spring captivated within said battery receptacle against one of said battery terminal surfaces of said planar battery and having a first tab connected to said positive terminal; and a second curved spring captivated within said battery receptacle against the remaining battery terminal surface of said planar battery and having a second tab connected to said negative terminal.

* * * * *